(12) United States Patent
Yamada et al.

(10) Patent No.: US 7,679,230 B2
(45) Date of Patent: Mar. 16, 2010

(54) BRUSHLESS MOTOR AND FAN UNIT

(75) Inventors: Suguru Yamada, Kyoto (JP); Takashi Nagamitsu, Kyoto (JP); Yoshihisa Kato, Kyoto (JP)

(73) Assignee: Nidec Corporation, Kyoto (JP)

(*) Notice: Subject to any disclaimer, the term of this patent is extended or adjusted under 35 U.S.C. 154(b) by 0 days.

(21) Appl. No.: 11/952,663

(22) Filed: Dec. 7, 2007

(65) Prior Publication Data

US 2008/0079325 A1 Apr. 3, 2008

Related U.S. Application Data

(63) Continuation of application No. PCT/JP2007/061647, filed on Jun. 8, 2007.

(30) Foreign Application Priority Data

Jun. 9, 2006 (JP) .............................. 2006-161078

(51) Int. Cl.
*H02K 3/52* (2006.01)
*H02K 11/00* (2006.01)
*H02K 29/00* (2006.01)
*H02K 9/06* (2006.01)

(52) U.S. Cl. ............................ 310/43; 310/71; 310/180
(58) Field of Classification Search .................. 310/43, 310/67 R, 71, 180
See application file for complete search history.

(56) References Cited

U.S. PATENT DOCUMENTS 4,633,110 A * 12/1986 Genco et al. .................. 310/71
5,877,574 A * 3/1999 Molnar ........................ 310/215
5,990,247 A * 11/1999 Terada et al. ................ 525/415

(Continued)

FOREIGN PATENT DOCUMENTS

JP 63100944 U 6/1988

(Continued)

OTHER PUBLICATIONS

International Search Report of PCT/JP2007/061647, date of mailing Sep. 11, 2007.

(Continued)

*Primary Examiner*—Quyen Leung
*Assistant Examiner*—David W. Scheuermann
(74) *Attorney, Agent, or Firm*—Westerman, Hattori, Daniels & Adrian, LLP

(57) ABSTRACT

A stator core 35 includes a core back 352 of a substantially annular shape. At a radially outer end portion of the core back 352 four teeth 351 are arranged radially. At the teeth 351, a coil 371 is formed by winding a magnet wire 37 via an insulator 36. A first insulator 361 configuring a lower half of the insulator 36 includes a first core back insulating portion 3611, 1 first teeth insulating portion 3612, and a first cylindrical portion 3613. A hook portion 4 is formed at the first core back insulating portion 3611 at radially outer side, and between the teeth 351. The magnet wire 37 extracted from the coil 371 is hooked on the hook portion 4. The magnet wire 37 hooked on the hook portion 4 is lead the magnet wire 37 around the hook portion 4 as a base, and is soldered to a land 381 formed above a circuit board 38.

16 Claims, 14 Drawing Sheets

U.S. PATENT DOCUMENTS 6,856,055 B2 * 2/2005 Michaels et al. ............... 310/71
2006/0043802 A1 3/2006 Sugiyama et al.
2008/0079325 A1 * 4/2008 Yamada et al. ............ 310/67 R

FOREIGN PATENT DOCUMENTS

| JP | 779557 A | 3/1995 |
| JP | 10285894 A * | 10/1998 |
| JP | 10309054 A | 11/1998 |
| JP | 3127916 B2 | 11/2000 |
| JP | 2001241395 A | 9/2001 |
| JP | 200674864 A | 3/2006 |

OTHER PUBLICATIONS

International Preliminary Report on Patentability dated Jan. 13, 2009, issued in corresponding international application No. PCT/JP2007/061647.

* cited by examiner

BRUSHLESS MOTOR AND FAN UNIT

TECHNICAL FIELD

The present invention relates to a brushless motor including an insulator having a hook portion for hooking thereon a magnet wire coming off a coil.

BACKGROUND ART

In recent years, due to improvement in performance of high performance electronic equipment, a heat generated by circuit components (for example, circuit component such as an MPU) installed in the electronic equipment is on a steady increase. Therefore, due to the increased heat of the circuit components, a temperature within a housing of the electronic component increases greatly. Thus, a cooling fan is used for cooling the inside of the housing of the electronic component and the circuit components.

A conventional cooling fan includes a rotor portion, an armature and a base portion. The rotor portion includes an annular rotor magnet, and an impeller arranged in a circumferential direction centering a central axis of the rotor portion. The armature is affixed to the base portion so as to radially oppose the rotor magnet. The armature includes a plurality of teeth each extending in a radial direction. A magnet wire is wound around each tooth via an insulator in order to form a coil around each tooth. When the magnet wire is wound around the teeth, a predetermined amount of tension is imparted on the magnet wire. In general, the coil has the magnet wire which is wound around the teeth wherein the magnet wire has a predetermined tension so as not to slack. The tension provided to the magnet wire becomes greater when a diameter of the magnet wire is greater. The magnet wire which forms the coil is electrically connected via a conductive pin to a circuit on which the circuit components are mounted in order to control a rotation of the rotor portion. The conductive pin is affixed to the insulator. The magnet wire which forms the coil is wound around the teeth, wound around the conductive pin without slack, and then is soldered to a circuit board. Since the conductive pin is soldered to the circuit board, the magnet wire and the circuit board are electrically connected to one another. A drive current is supplied from an external source to a control circuit, an electric current is conducted through the magnet wire wound around the teeth, and then, a magnetic field is generated at a radial gap between the teeth and the rotor magnet. As the magnetic field is generated, the teeth and the rotor magnet attract one another, and repel one another. Due to such interaction between the teeth and the rotor magnet as described above, a rotary torque centering about the central axis is generated in the rotor portion.

Due to the great deal of increase in the temperature within the electric component, there is a further demand for cooling within the electric component. Therefore, there is an increased demand for a cooling fan having a cooling characteristic superior to that of the conventional cooling fan. In general, in order to improve the cooling characteristic of the cooling fan, a flow quantity of the cooling fan needs to be improved so as to increase a volume of heated air exhausted from the housing of the electric component. In order to improve the flow quantity, an air flow which is generated when the impeller rotates needs to be increased, which consequently increases a work load of the impeller and therefore a current value of the electricity supplied to the cooling fan becomes high. When an electric current is conducted to the magnet wire wound around a stator core, an electric resistance of the magnet wire causes the increase in the temperature of the magnet wire. When the electric current conducted to the magnet wire is high, the increase in the temperature of the magnet wire is further increased.

Conventionally, when designing a motor of a high speed rotation, a magnet wire having a low electric resistance is used. That is, when designing a motor whose impeller, when being rotated, is expected to perform a great deal of work load (i.e., flow quantity of air flow generated in accordance with the rotation of the impeller), a magnet wire having a diameter greater than the conventional diameter is used. However, when the magnet wire having the greater diameter is wound around the teeth, tension imparted on magnet wire is conducted to the conductive pin, stressing the conductive pin excessively and increasing the possibility of slackening the conductive pin. When the conductive pin is not used (e.g., a land formed at the circuit wiring configuring the control circuit is used), the magnet wire forming the coil is directly soldered to the land. When the magnet wire is soldered to the land, it is preferable that the neither the magnet wire nor the coil is soldered without being slackened. In order to solder the magnet wire or the coil without having them slackened, the magnet wire and the coil need to be soldered while tension is applied thereto. However, the tension applied to the magnetic wire and the coil may be eased however slightly, and therefore, the magnetic wire and the coil are slackened. Therefore, it is a difficult task to solder the magnetic wire forming the coil without allowing the magnetic wire to be slackened. The slack formed on the magnetic wire is conducted, due to vibration of the motor, to the coil, and thereby forming a slack on the coil. Once a slack is formed on the coil, there is a possibility that the magnetic wire comes off the coil, comes into contact with a rotor arranged axially above the coil, and then is damaged.

In view of the above problem, a following configuration is disclosed according to a cooling fan shown in FIG. 1 of a Patent Document 1. An annular wire holder includes a hook portion which protrudes toward a central axis from a radially inner edge portion. A magnet wire is hooked on the hook portion of the wire holder. By virtue of such configuration, a coil wire will be handled with facility.

[Patent Document 1] Japanese Patent Publication No. 3127916 (FIG. 1)

DISCLOSURE OF THE INVENTION

Problems to be Solved by the Invention

However, according to the configuration indicated in the patent document 1, the annular wire holder is arranged in an axial direction between a radial outer end surface of each tooth opposed to a circuit board and the circuit board. Therefore, a process of soldering the magnet wire forming the coil to the land of the circuit board needs to be executed by inserting a soldering iron into a space between the wire holder and the circuit board, or a space between teeth. For example, when the soldering process is executed by inserting the soldering iron in the space between teeth (i.e., a tight space between coils), the process requires care so as not to let a tip of the soldering iron touch the coil. Also, when the soldering process is executed automatically, a high precision is required when inserting the soldering iron in the space between the wire holder and the circuit board; or otherwise contact may be made between the soldering iron and the coil. In order to prevent a short circuit, which occurs due to contact between magnet wires, the magnet wire is coated with an insulating film (e.g., polyurethane resin) on the surface thereof. If the tip of the soldering iron makes contact with the magnet wire, the resin coated on the surface of the magnet wire may be removed therefrom, which may allow the short circuit to occur when the magnet wires make contact with one another. Therefore, it is necessary that the hook portion be formed and arranged such that the magnet wire which is hooked on the hook portion is soldered to the circuit board facilitatedly.

In view of the problems described above, an object to the present invention is to provide a means which allows a magnet wire which is hooked on a hook portion to facilitatedly be connected to a circuit board.

Means for Solving the Problems

In order to achieve the above mentioned object, a brushless motor of one embodiment of the present invention is characterized in that the brushless motor comprises an armature, a rotor portion including a rotor magnet generating between the armature a torque centering about a central axis, the rotor portion rotates relatively with respect to the armature centering about the central axis, a base portion supporting the armature in the fixed manner, and a circuit board arranged between the armature and the base portion, and configured thereon a circuit controlling a rotation of the rotor portion, wherein the armature includes a core back, a plurality of teeth arranged in a radial manner centering about the central axis with respect to the core back, an insulator made of an insulating material covering at least a small portion of an outer surface of the plurality of teeth, and a coil formed by winding the magnet wire around each of the plurality of teeth via the insulator, the insulator includes a hook portion, the magnet wire is hooked on the hook portion and is electrically connected to the circuit board at the end of the magnet wire.

As an embodiment, an end portion of the magnet wire hooked on the hook portion is extracted in a radially outward direction from the hook portion and is electrically connected.

As an embodiment, the circuit board is connected to the armature via the insulator.

As an embodiment, the insulator is made of a resin material by an injection molding.

As an embodiment, the insulator includes a core back insulating portion covering an outer side surface of the core back, the hook portion is formed at the core back insulating portion.

As an embodiment, the core back insulating portion includes a cylindrical portion centering about the central axis in a direction away from the core back in an axial direction parallel to the central axis, the hook portion is formed at the cylindrical portion.

As an embodiment, the hook portion is formed at a space between adjacent teeth when seen from the axial direction.

As an embodiment, the insulator includes a teeth insulating portion covering the teeth, the hook portion is formed at the teeth insulating portion.

As an embodiment, the insulator includes a first insulator attached to the core hack and each tooth from a side of the base portion, and a second insulator attached to the core back and each tooth from a side opposite from the base portion.

As an embodiment, the hook portion is formed at the first insulator.

As an embodiment, the hook portion is formed at the second insulator.

As an embodiment, the magnet wire is electrically connected via a conductive pin affixed to the insulator to the circuit board at the end of the magnet wire.

As an embodiment, the hook portion includes a portion which is bent.

As an embodiment, a fan unit uses the brushless motor of the invention. As an embodiment, the rotor portion includes a plurality of blades rotating, intaking from one end in the axial direction air and thereby generating an air flow directed to the other end in the axial direction, and the plurality of blades are surrounded in the radial direction by a housing forming a pathway for the air flow, the housing and the base portion are connected by the supporting leg portion.

As an embodiment of the fan unit, the rotor portion includes a plurality of blades arranged at the rotor portion at radially outer side thereof in the circumferential manner centering about the central axis, and a housing formed such as to exhaust in the radially outward direction air taken in the axial direction.

As an embodiment, the brushless motor comprises an armature, a rotor portion including a rotor magnet generating between the armature a torque centering about a central axis, the rotor portion rotates relatively with respect to the armature centering about the central axis, a base portion supporting the armature in a fixed manner, and a circuit board arranged between the armature and the base portion, and configured thereon a circuit controlling a rotation of the rotor portion, wherein the armature includes, a core back, a plurality of teeth arranged in a radial manner centering about the central axis with respect to the core back, a coil formed by winding a magnet wire around each of the plurality of teeth, and a spacer connecting at least the circuit board and the core back, or the circuit board and the plurality of teeth in the axial direction, the spacer includes a hook portion, the magnet wire is hooked on the hook portion and is electrically connected to the circuit board at the end of the magnet wire.

As an embodiment, the spacer is made of a resin material by an injection molding.

As an embodiment, the hook portion is formed at a space between adjacent teeth when seen from the axial direction.

As an embodiment of the fan unit, the rotor portion includes a plurality of blades rotating, intaking from one end in the axial direction air and thereby generating an air flow directed to the other end in the axial direction, and the plurality of blades are surrounded in the radial direction by a housing forming a pathway for the air flow, the housing and the base portion are connected by the supporting leg portion.

As an embodiment of the fan unit, the rotor portion includes a plurality of blades arranged at the rotor portion at radially outer side thereof in the circumferential manner centering about the central axis, and a housing formed such as to exhaust in the radially outward direction air taken in the axial direction.

EFFECT OF THE INVENTION

A magnet wire forming a coil is hooked on a hook portion formed at an insulator or a spacer and is guided to a preferable direction from the hook portion. Therefore, the magnet wire can be guided to a position which allows it to be easy for the magnet wire to be soldered to a circuit board. Also, since the magnet wire is hooked on the hook portion, tension imparted on the magnet wire when forming the coil will be maintained. By this, it becomes possible to reduce likeliness to slacken the coil.

EXPLANATION OF REFERENCE

A AXIAL FLOW FAN
1 HOUSING
12 BASE PORTION
13 SUPPORTING LEG PORTION
22 BLADE
3 ARMATURE
35 STATOR CORE
351 TEETH
352 CORE BACK
36 INSULATOR
361 FIRST INSULATOR
3611 FIRST CORE BACK INSULATING PORTION
3612 FIRST TEETH INSULATING PORTION
3613 FIRST CYLINDRICAL PORTION
362 SECOND INSULATOR
3621 SECOND CORE BACK INSULATING PORTION
3622 SECOND TEETH INSULATING PORTION
3623 SECOND CYLINDRICAL PORTION
37 MAGNET WIRE
371 COIL
38 CIRCUIT BOARD
381 LAND
382 CONDUCTIVE PIN
4 HOOK PORTION
3A ARMATURE
35A STATOR CORE
351A TEETH
352A CORE BACK
4A HOOK PORTION
5 SPACER
51 Spacer Cylindrical Portion
52 FIRST CONNECTING PORTION
53 SECOND CONNECTING PORTION

BEST MODE FOR CARRYING OUT THE INVENTION

Hereinafter, a brushless motor according to each embodiment of the present invention will be described with reference to FIG. 1 through FIG. 12. Note that in the description herein, an axial flow fan will be described as an embodiment of the brushless motor according to the present invention. Note that although in the description herein, words such as upper side and lower side are indicated in accordance with the drawings in order to facilitate the understating of the description, it is understood that such words do not restrict the actual direction in which elements described herein are mounted. Also note that a direction parallel to the central axis will be referred to as axial direction and a direction centering about the central axis will be referred to as radial direction.

Figure 1:
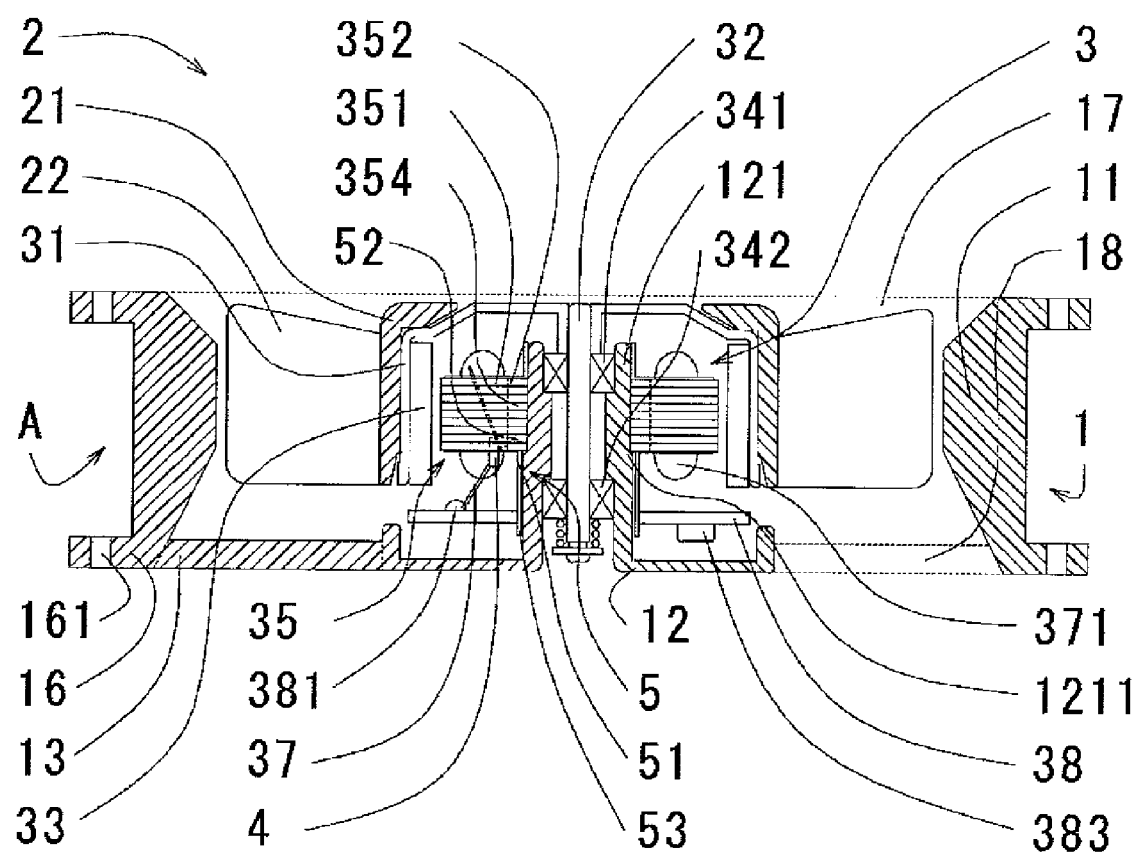
FIG. 1 is a cross sectional diagram showing an axial flow fan according to a first embodiment.

Hereinafter, the axial flow fan according to the first embodiment of the present invention will be described. FIG. 1 is a cross sectional diagram showing an axial flow fan A according to the first embodiment. When an electric current is supplied from an external power source to the axial flow fan A, an impeller 2 including a plurality of blades 22 rotates. The impeller 2 includes an impeller cup 21 of a substantially cylindrical shape. The plurality of blades 22 are formed at radially outer side of the impeller cup 21.

A rotor yoke 31 of a substantially cylindrical shape with a cover is affixed to an inner circumferential surface of the impeller cup 21. A rotor magnet 33 having a plurality of magnetic poles polarized in an alternative manner in a circumferential direction is affixed to an inner circumferential surface of the rotor yoke 31. The rotor yoke 31 is made of a magnetic material. Since the axial flow fan A may be used in a highly humid environment, the rotor holder is preferably made of a material excellent in anti-corrosion quality. Therefore, a magnetic circuit is formed in a space between the rotor yoke 31 and the rotor magnet 33, and it becomes possible to reduce a leakage of flux from the rotor magnet 33 to an outside of the axial flow fan A. Also, it becomes possible to enhance a density of the magnetic flux generated from the rotor magnet 33. A shaft through hole which is formed by a burring process during a pressing is formed at a center of the rotor yoke 31. A shaft 32 is affixed in the shaft through hole.

The shaft 32 is relatively supported in a rotatable manner with respect to a base portion 12 (described below) when the shaft 32 is inserted in an upper ball bearing 341 and a lower ball bearing 342. The upper ball bearing 341 and the lower ball bearing 342 each are affixed to an inner circumferential surface of a bearing housing 121 of a substantially cylindrical shape which is formed at a center of the base portion 12. A step portion for determining an axial position the upper ball bearing 341 and the lower ball bearing 342 is formed at the inner circumferential surface of the bearing housing 121. When the upper ball bearing 341 and the lower ball bearing 342 make contact with the step portion, their axial positions are determined. With respect to the bearing housing 121, the upper ball bearing 341 is inserted from axially upper side, and the lower ball bearing 342 is inserted from axially lower side. An annular shape ring is formed at an outer circumferential surface near a tip of the shaft 32. A wire ring 344 is affixed at the annular shape ring in order to form a mechanism preventing the shaft 32 from coming off the upper ball bearing 341 and the lower ball bearing 342. A spring 343 is arranged at a space between the lower ball bearing 342 and the wire ring 344. A load is continuously applied to the spring 343 such that an elastic force is generated thereby. Due to the elastic force, a pressure is applied to the upper ball bearing 341 and the lower ball bearing 342.

A housing 1 is arranged radially outward of the impeller 2. The housing 1 forms a pathway for an air flow which is generated due to rotation of the impeller 2 centering about the central axis. The housing 1 includes at an upper side according to FIG. 1 an intake vent 17 and at a lower side an exhaust vent 18. That is, when the impeller 2 rotates centering about the central axis, an air flow is generated flowing from the axially upper side to the axially lower side, wherein the air flow travels through an air flow passage formed at the inner side surface of the housing 2.

The housing 1 according to the present embodiment has an upper end surface and a lower end surface in the axial direction each having a substantially square shape. At four corners of the upper end surface and the lower end surface of the housing 1 which defines the air flow passage a flange 16 extending from the inner circumferential surface to radially outward away from the central axis is formed. Each flange 16 includes a fixing hole 161 in which a fixing element (e.g., screw) will be inserted when the axial flow fan A is mounted on an apparatus. Note that the shape of the upper end surface and that of the lower end surface are not limited to the substantially square shape; the shape may be a substantially circular shape.

The housing 1 and the base portion 12 are arranged such that the central axis of the housing 1 and that of the base portion 12 are concentric with one another. Four supporting leg portions 13 are formed in the radial direction from the base portion 12 away from the central axis. Also, each supporting leg portion 13 is connected at the radially outermost portion thereof to the inner circumferential surface of the housing 1. That is, the housing 1 and the base portion 12 are connected to one another via the supporting leg portions 13. Note that the number of the supporting leg portion 13 is not limited to four; it may be 3 or 5. Note that although the present embodiment assumes that the base portion 12 and each supporting leg portion 13 are formed at the side of the exhaust vent 18, they may be formed at the side of the intake vent 17.

According to the present embodiment, the housing 1, the base portion 12, the bearing housing 121, and the supporting leg portions 13 are made of a resin material. The housing 1, the base portion 12, the bearing housing 121, and the supporting leg portions 13 are preferably made as a continuous single component by a method such as an injection molding, for example. The resin injection molding is a method in which the resin material is heated, melted, then injected into a mold, and cooled and solidified inside and outside of the mold in order to form a product. Since the resin injection molding is applied, a mass production in a short amount of time, compared with a cutting processing, is made possible.

The armature 3 is attached to the outer circumferential surface of the bearing housing 121 via the upper side in the axial direction. The armature 3 is supported by a step portion 1211 arranged at the outer side surface of the bearing housing 121. The armature 3 includes a stator core 35, an insulator 36, and a magnet wire 37.

The stator core 35 is formed by laminating a plurality (9 in the present embodiment) of core plates in the axial direction and caulking them in order to join them. A silicon steel plate, for example, is used as a material for the core plate. The stator core 35 includes a core back 352 of a substantially annular shape or a substantially cylindrical shape. A plurality (4 in the present embodiment) of teeth 351 are arranged at a radially outer surface of the core back 352 in the radial direction centering about the central axis. Since the plurality of teeth 351 and the core back 352 are formed continuously, a magnetic circuit having a reduced magnetic loss is generated at the space between the plurality of teeth 351 and the core back 352. An outer surface of each tooth 351 is opposed via a radial gap to the rotor magnet 33 affixed on the inner circumferential surface of the rotor yoke 31.

The magnet wire 37 is wound around each tooth 351 via the insulator 36 which is made of an insulating material. The magnet wire 37 used herein has a diameter of 0.05 mm to 0.8 mm. In order to achieve a stabilized value of resistance and a stabilized value of inductance, when the magnet wire 37 is wound around each tooth 351, a predetermined tension in accordance with the diameter of the magnet wire is applied thereto. When an uneven tension is applied to the magnet wire 37 when the same is wound, a characteristic of rotation of the motor may be varied since the stabilized value of resistance and/or the stabilized value of inductance of the magnet wire 371 is not achieved.

The insulator 36 is made by an injection molding using a resin material (e.g., nylon, PBT (polybutylene telephthalate), or POM (polyacetal)). The insulator 36 includes a first insulator 361 which is attached to the stator core 35 from the axially lower side and a second insulator 362 which is attached to the stator core 35 from the axially upper side. Note that the first insulator 361 and the second insulator 362 may be formed integrally as a surface of the stator core 35 is resin molded, and the insulating film is formed at the surface of the stator core 35.

Figure 2:
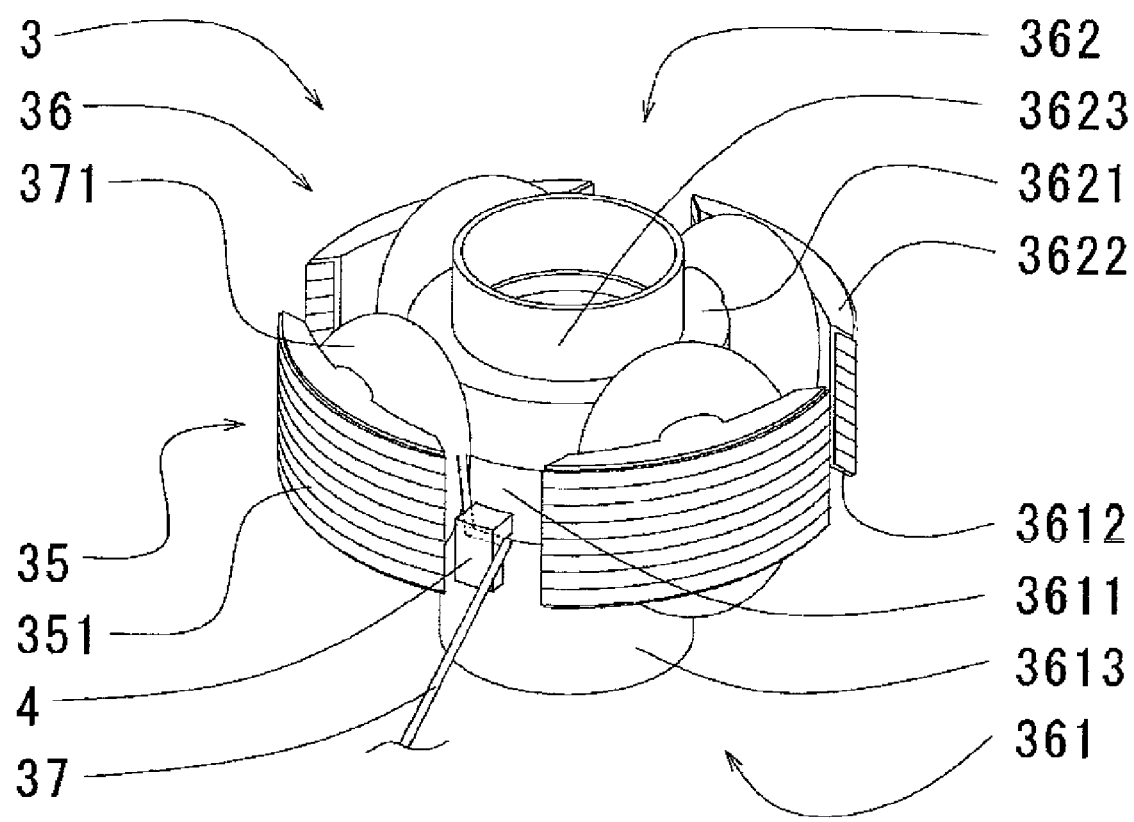
FIG. 2 is a perspective diagram showing an armature according to the first embodiment.

As shown in FIG. 2, the first insulator 361 includes and is formed continuously by the injection molding with a first core back insulating portion 3611 which covers the core back 352, a first teeth insulating portion 3612 which covers the teeth 351, and a first cylindrical portion 3613. The first cylindrical portion 3613 is formed at a bottom end surface of the first core back insulating portion 3611. The circuit board 38 is arranged at an axially lower side of the first cylindrical portion 3613.

As shown in FIG. 2, the second insulator 362 includes and is formed continuously as a single component by the injection molding with a second core back insulating portion 3621 which covers the core back 352, a second teeth insulating portion 3622 which covers the teeth 351, and a second cylindrical portion 3623. The second cylindrical portion 3623 is formed at a top end surface of the second core back insulating portion 3621. Further, the inner circumferential surface of the second cylindrical portion 3623 makes contact with the outer circumferential surface of the bearing housing 121 in the radial direction. An internal diameter of the second cylindrical portion 3623 is formed to be slightly smaller than an external diameter of the bearing housing 121. That is, the bearing housing 121 is press fitted into the second cylindrical portion 3623. Therefore, the armature 3 is affixed to the bearing housing 121 by the second cylindrical portion 3623. Note that the armature 3 is more firmly affixed to the bearing housing 121 since an adhesive is applied in the space between the inner circumferential surface of the stator core 35 and the bearing housing 121.

A circuit wiring is formed at either side of the circuit board 38. An electrically connecting layer is formed at an inner circumferential surface of a hole penetrating the circuit wirings formed at the sides of the circuit board 38. The circuit wirings formed at the sides of the circuit board 38 are electrically connected to one another via the electrically connecting layer.

A land 381 for soldering thereon the magnet wire 37 and the circuit component 383 is formed at the circuit wiring formed at the sides of the circuit board 38. A series of drive control circuit controlling the rotation of the impeller 2 will be formed when the magnet wire 37 and the circuit component 383 are soldered to the land 381.

A central hole is formed at the center of the circuit board 38. The first cylindrical portion 3613 is inserted into the central hole of the circuit board 38 from the axially upper side. At this point, the circuit board 38 is such that a side on which the circuit component 383 which is a principle component for the circuit wiring is soldered to will be facing the side of the base portion 12. Note that the circuit component 383 may be soldered to the upper side of the circuit board 28. With respect to the first cylindrical portion of the circuit board 38 an inner circumferential surface of the central hole of the circuit board 38 is affixed at a position opposed in a radial direction to an outer circumferential surface of the first cylindrical portion 361. By this, it becomes possible to attach the armature to the bearing housing 121 with facility.

The electric current which is supplied from the external power source via a power wire (not shown) is conducted to the magnet wire 37 via the circuit component 383 which is soldered to the circuit wiring. A driving IC or a Hall element, for example, for controlling the rotation of the impeller 2 may be used for the circuit component 383. Therefore, the electric current is supplied to the coil 371, and a magnetic field will be generated in the radial space between the outer circumferential surface of the teeth 351 and the inner circumferential surface of the rotor magnet 33. Due to the magnetic field that is generated, teeth 351 and the rotor magnet 33 attract one another, and repel one another. Due to the interaction affecting the teeth 351 and the rotor magnet 33, a rotary torque centering about the central axis is generated to the impeller 2. By this, the impeller 2 rotates with the shaft 32 as the rotary axis.

Next, a hook portion 4 will be described. As shown in FIG. 1, the hook portion 4 is formed protrudingly at the outer side surface of the first core back insulating portion 3611. An end portion of the magnet wire 37 forming the coil 371 is hooked on the hook portion 4. What is meant by "hook" herein is that the magnet wire 37 is bent toward a direction different from a direction in which the magnet wire 37 extends off the coil 371. An optimal state of the magnet wire 37 being hooked is when a tension applied to the magnet wire 37 extracted from the coil 371 is different from a tension applied to the magnet wire 37 past the hook portion 4. As stated above, the coil 371 is formed by winding the magnet wire 37 having a predetermined tension about the teeth 351. When the magnet wire 37 is hooked at the hook portion 4, the predetermined tension is maintained at the coil 371. It becomes possible to apply reduced amount of tension to the magnet wire 37 between the coil 371 and the hook portion 4 than the amount of tension applied to the magnet wire 37 further from the coil 371 than the hook portion 4. As for a method to hook the magnet wire 37 on the hook portion 4, the magnet wire 37 may be hooked on the hook portion 4 and/or wound about the hook portion 4. Since it is possible to apply the reduced amount of tension to the magnet wire 37 away from the coil 371 past the hook portion 4, it becomes possible to make it difficult to impart tension to the land when the end portion of the magnet wire 37 is soldered to the land 381. According to the present embodiment, the magnet wire 37 is wound about the teeth 351, then hooked on the hook portion 4, and the end portion of the magnet wire 37 is soldered to the land 381. Note that the aforementioned procedure is not limited as described above; the magnet wire 37 may be hooked on the hook portion 4 after soldered to the land 381.

Next, a configuration of the hook portion 4 will be described into detail. The hook portion 4 is, as shown in FIG. 2, formed protrudingly toward the radially outward direction at the outer side surface of the first core back insulating portion 3611. The hook portion 4 includes a bent portion at which the hook portion 4 is bent toward the axially downward direction. When the magnet wire 37 is hooked on the hook portion 4 near the bent portion, the magnet wire 37 is securely hooked on the hook portion 4. To describe more in detail, the magnet wire 37 coming off the coil 371 to the hook portion 4 in the axial direction. Then, the magnet wire 37 is hooked on the hook portion 4, and extracted in the radially outward direction from the hook portion 4. That is, the magnet wire 37 on the side of the coil 371 is hooked on the hook portion 4 toward the first core back insulating portion 3611 than the bent portion, and the magnet wire 37 on the side of the end portion is hooked on the hook portion 4 toward the tip than the bent portion. By virtue of such configuration, it becomes possible to change a direction (i.e., axial direction or radial direction) to which the magnet wire 37 is extracted when the magnet wire 37 is hooked on the hook portion 4. Note that the configuration of the hook portion 4 is not limited as described above. The hook portion 4 needs to be designed such as to allow the magnet wire 37 to be hooked thereon in one direction and to be extracted therefrom in another direction while securing the magnet wire 37.

According to the present embodiment, as shown in FIG. 1, the circuit board 38 has formed thereon, on the side the armature 3 is, the land 381 to which the end of the magnet wire 37 is soldered. Also, on the side of the circuit board 38 the base portion 12 is the circuit component 383 is soldered thereto. Since the magnet wire 37 is hooked on the hook portion 4, even when the magnet wire 37 is slackened at the end portion thereof, the slack is less likely to be shifted to the magnet wire 37 toward the coil 371 than the hook portion 4. Although the present embodiment assumes that the end portion of the magnet wire 37 is soldered to the circuit board 38 on the side of the stator 35, the soldering may be executed on the side of the base portion 12 of the circuit board 38. Note that a position of the soldering may be varied depending on the design. Similarly for the circuit component 383, there is not a particularly designated position to which the circuit component 383 is soldered.

Figure 3:
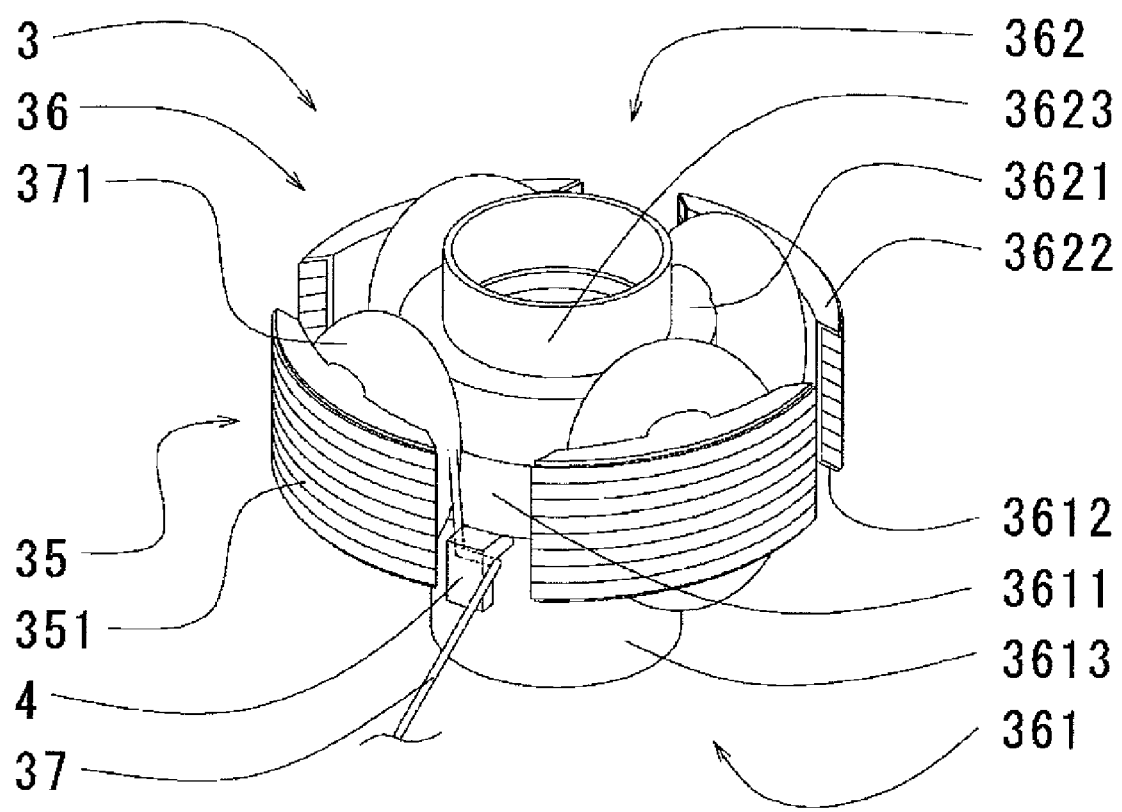
FIG. 3 is a perspective diagram showing the armature according to a variant of the first embodiment.
Figure 4:
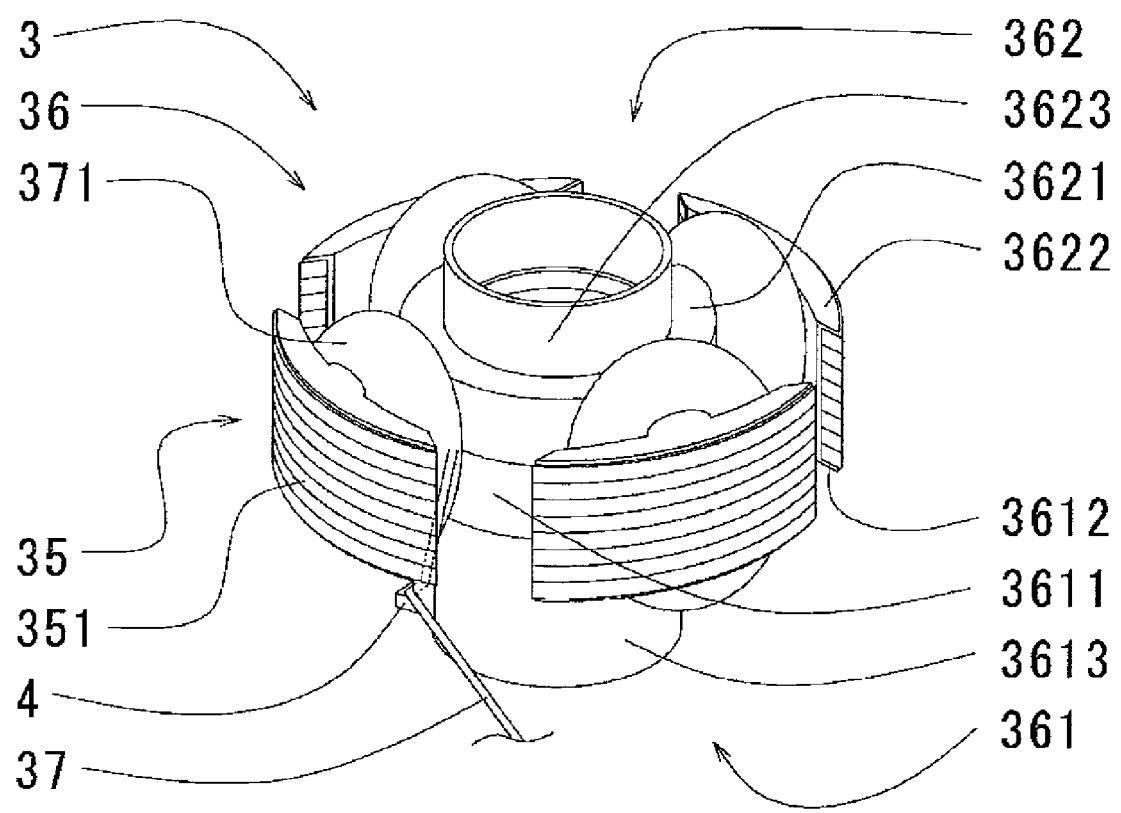
FIG. 4 is a perspective diagram showing the armature according to another variant of the first embodiment.

The hook portion 4 may be, as shown in FIG. 3, formed at the outer side surface of the first cylindrical portion 3613. Also, the hook portion 4 may be, as shown in FIG. 4, formed at the first teeth insulating portion 3612. In either case, the forming of the hook portion 4a will not hinder the forming of the coil 371. Therefore, a large space for forming the coil 371 will be provided around the teeth 351. That is, a space factor for the coil 371 will be improved, thereby allowing the motor to be highly efficient.

Figure 5:
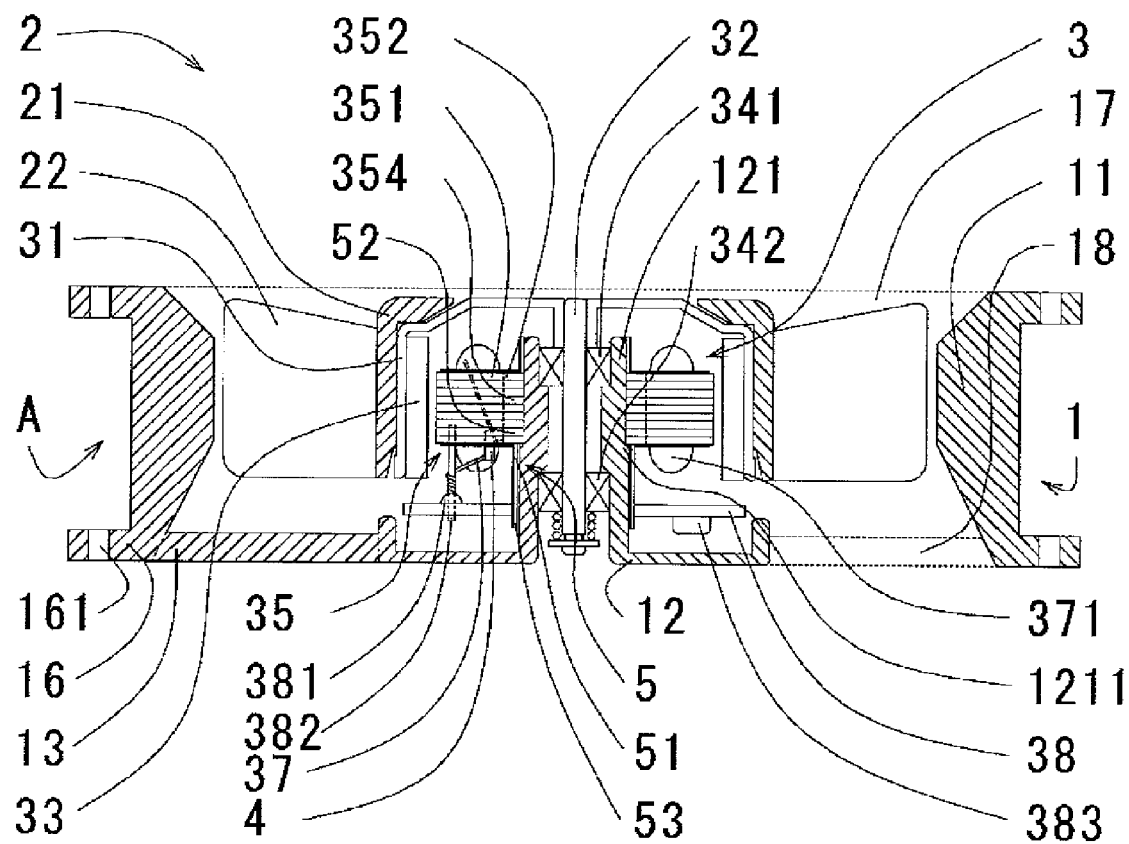
FIG. 5 is a perspective diagram showing the axial flow fan according to another variant of the first embodiment.

The magnet wire 37 may be, as shown in FIG. 5, electrically connected to the land 381 via the conductive pin 382. That is, the magnet wire 37 needs not be electrically connected to the land 381 directly. The conductive pin 382 is stationarily supported by the first core back insulating portion 3611. The magnet wire 37 hooked on the hook portion 4 is wound around the conductive pin 382. At this point, when the portion of the magnet wire 37 wound around the conductive pin 382 is soldered, since the surface coating of resin on the magnet wire 37 will be melted, and therefore, the magnet wire 37 and the conductive pin 382 will be electrically connected. Next, the conductive pin 382 will be inserted through the through hole formed at the circuit board 38. The land 381 is formed around the through hole. When the land 381 and the conductive pin 382 are soldered to one another, the land 381 and the conductive pin 382 will be electrically connected. Further, the conductive pin 382 will be soldered to the circuit board 38, and therefore, the armature 3 and the circuit board will be fixed. As shown in FIG. 5, when the circuit wiring is formed at both sides, the soldering fixing the conductive pin 382 can be executed on either side. When the circuit wiring is formed at only one side, the soldering is executed on the side of the circuit wiring.

The insulator 36 is made of a resin material and formed by the injection molding. The mold used for the injection molding to form the insulator 36 includes a sliding side mold and a fixed side mold. The fixed side mold and the sliding side mold make contact with one another in the axial direction. Then, the resin material is injected into a space generated between the molds. After the injected resin is cooled and hardened, the fixed side mold and the sliding side mold are removed from one another forming the insulator 36. Here, when the hook portion 4 is formed at the outer side surface of the first core back insulating portion 3611, if the hook portion 4 is formed such as to axially overlap with the first teeth insulating portion 3612, a dead angle will be made, when seen from the axial direction, at an axial space between the first teeth insulating portion 3612 and the hook portion 4. When such insulator is formed by resin molding, an excessively bulging portion will be generated between the first teeth insulating portion 3612 and the hook portion 4. The excessively bulging portion is formed when the insulator is formed by the mold, and is preferably, if possible, avoided. Therefore, according to the present embodiment, the hook portion 4 formed at the outer side surface of the first core back insulating portion 3611 is, as shown in FIG. 2, formed, when seen in the axial direction, between two adjacent teeth 351. When the hook portion 4 is formed between the teeth 351, an upper surface of the hook portion 4 is formed by the sliding side mold, and a lower surface of the hook portion 4 is formed by the fixed side mold, for example. By virtue of such configuration, the insulator 36 is formed without forming the excessively bulging portion.

The magnet wire 37 is, in order to form the coil 371, wound around the teeth 351 each extending in the radial direction, wherein the radial direction is the center of the winding. Therefore, it is difficult to guide the magnet wire 37 extending from the coil 371 in the radially outward direction. However, as described above, when the magnet wire 37 is hooked on the hook portion 4, the direction in which the magnet wire 37 is guided may be changed. Therefore, the magnet wire 37 extracted from the coil along the circuit board 38 is extracted radially outwardly and soldered to the land 381.

At a surface bordering the soldering portion between the circuit board 38 and the magnet wire 37, a stress extending from the soldering portion in the direction the magnet wire 37 extends is generated. The stress can be broken into tensile stress acting perpendicularly to the bordering surface, and shear stress acting parallely. At the bordering surface between the soldering portion and the circuit board 38, the tensile stress has a greater strength for peeling than the shear stress. Therefore, it is preferable that the magnet wire 37 is soldered to the land 381 along the circuit board 38. When the hook portion 4 is formed at the first insulator 361, the magnet wire 37 hooked on the hook portion 4 will be facilitatedly extracted in the parallel direction with respect to the circuit board 38.

Next, a flow fan according to a second preferred embodiment of the present invention will be described. A configuration of the flow fan according to the second embodiment is substantially identical with the configuration of the flow fan A shown in FIG. 1, except for a position at which the hook portion is formed. In the description herein, corresponding elements are denoted with the same reference numerals. Also, a size of the flow fan is the same as that in the first embodiment.

Figure 6:
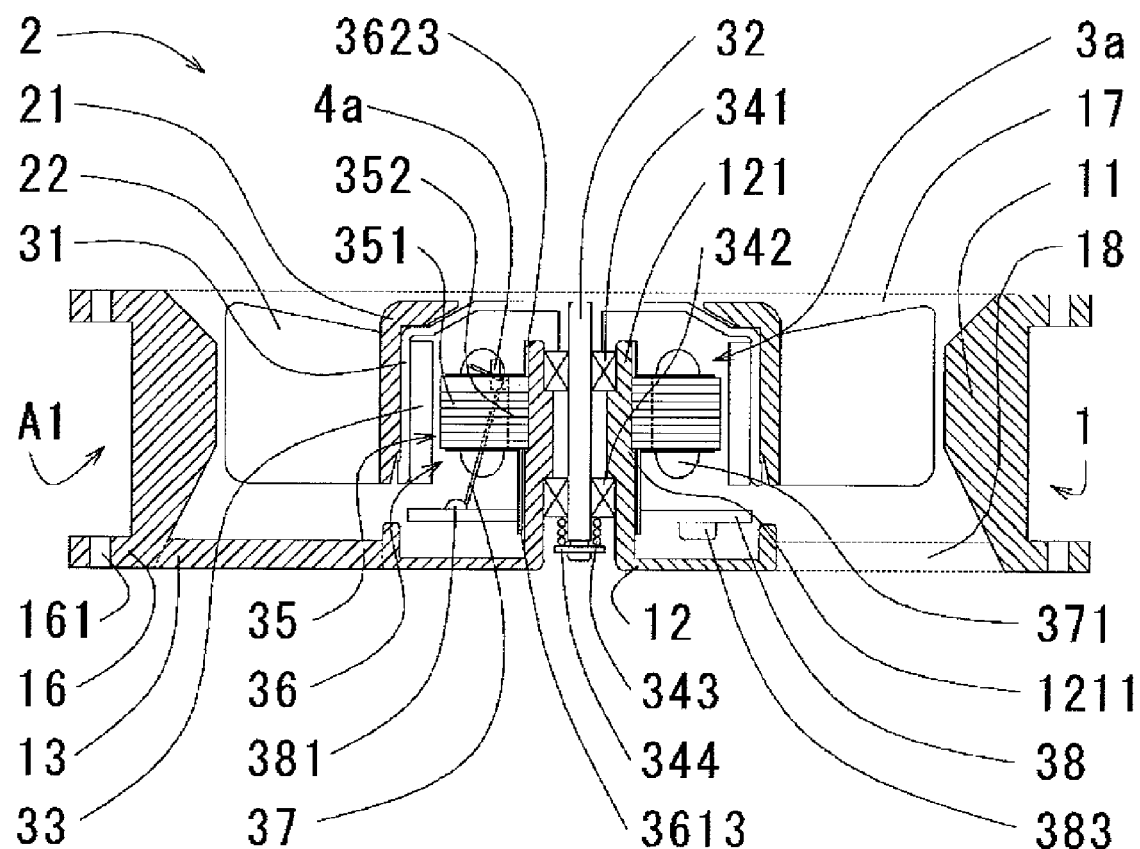
FIG. 6 is a cross sectional diagram showing the axial flow fan according to a second embodiment.
Figure 7:
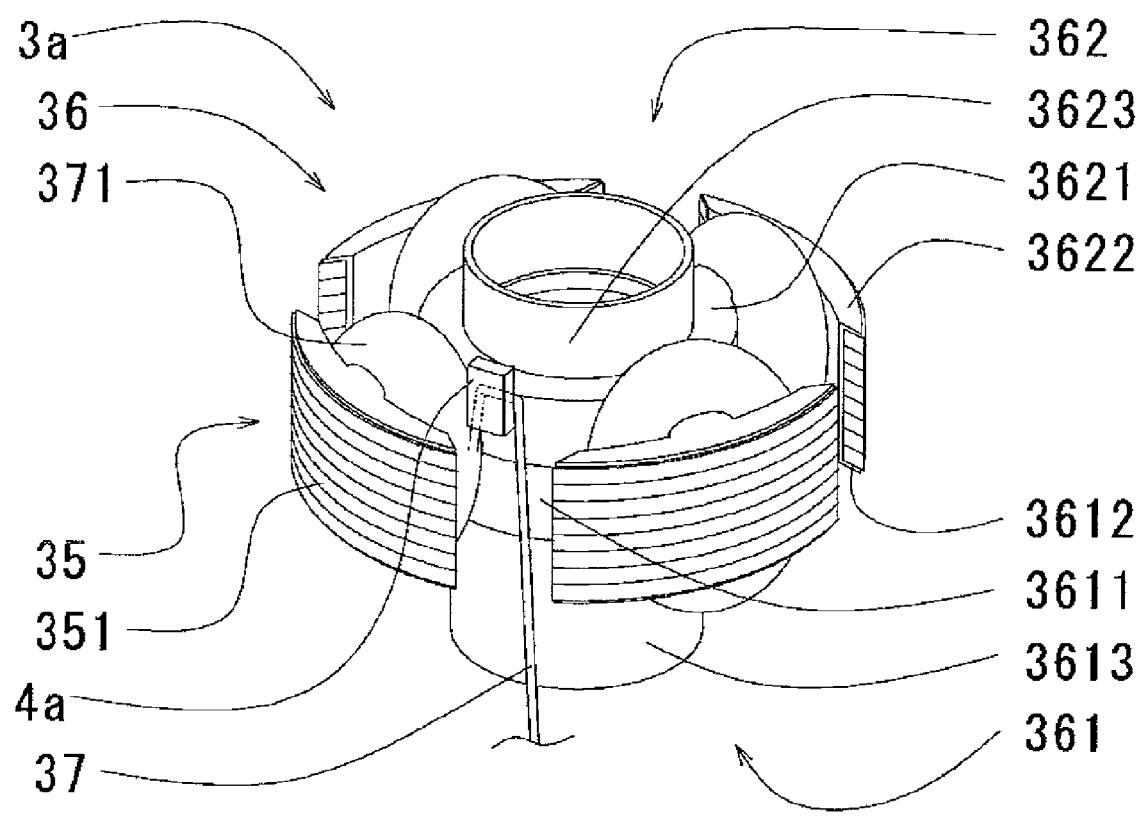
FIG. 7 is a perspective diagram showing the armature according to the second embodiment.

FIG. 6 is a diagram showing a cross section in the axial direction as seen from the radial direction of the axial flow fan A1 according to the second embodiment of the present invention. FIG. 7 is a perspective view of an armature according to the second embodiment of the present invention.

A hook portion 4a will be described. As shown in FIG. 6, the hook portion 4 is formed protrudingly in the radially outward direction at the outer side surface of the second core back insulating portion 3621. At the hook portion 4a, an end portion of the magnet wire 37 forming the coil 371 is hooked. As described above, the predetermined amount of tension is applied to the magnet wire 37 when wound around the teeth 351 to form the coil 371. The predetermine tension is maintained at the coil 371 since the magnet wire 37 is hooked on the hook portion 4a. It becomes possible to have the tension of the magnet wire 37 reduced at the end portion thereof which is hooked on the hook portion 4a and is opposite from the side of the coil 371. As for a method of hooking the magnet wire 37 on the hook portion 4a, the magnet wire 37 may be hooked on the hook portion 4a, wound around the hook portion 4a, and/or the like. Since the magnet wire 37 which is hooked on the hook portion 4a may have the reduced tension, it becomes possible to avoid a strong tension when the magnet wire 37 is soldered to the land 381. According to the present embodiment, the magnet wire 37 is wound around the teeth 351, hooked on the hook portion 4a, and then the end portion thereof is soldered to the land 381. Note that an order in which the processes are executed is not necessarily limited as described above; the magnet wire 37 may be soldered to the land 381, and then hooked on the hook portion 4a.

Next, a detailed configuration of the hook portion 4a will be described. The hook portion 4a is, as shown in FIG. 7, formed protrudingly at the outer side surface of the second core back insulating portion 3621 in the radially outward direction, wherein the bent portion is bent axially upward. When the magnet wire 37 is hooked on the hook portion 4a near the bent portion, the magnet wire 37 is securely hooked on the hook portion 4a. To describe more in detail, the magnet wire 37 is extracted from the coil 371 to the hook portion 4a in the axial direction. Then, the magnet wire 37 is hooked on the hook portion 4a, and extracted in the radially outward direction from the hook portion 4a. That is, the magnet wire 37 on the side of the coil 371 is hooked on the hook portion 4a toward the second core back insulating portion 3621 than the bent portion, and the magnet wire 37 on the side of the end portion is hooked on the hook portion 4 toward the tip than the bent portion. By virtue of such configuration, it becomes possible to change a direction (i.e., axial direction or radial direction) to which the magnet wire 37 is extracted when the magnet wire 37 is hooked on the hook portion 4. Note that the configuration of the hook portion 4 is not limited as described above. The hook portion 4 needs to be designed such as to allow the magnet wire 37 to be hooked thereon in one direction and to be extracted therefrom in another direction while securing the magnet wire 37.

According to the present embodiment, as shown in FIG. 6, the circuit board 38 has formed thereon, on the side the armature 3a is, the land 381 to which the end of the magnet wire 37 is soldered. Since the magnet wire 37 is hooked on the hook portion 4a, even when the magnet wire 37 is slackened at the end portion thereof, the slack is less likely to be shifted to the magnet wire 37 on the side of the coil 371 than the hook portion 4a. Although the present embodiment assumes that the end portion of the magnet wire 37 is soldered to the circuit board 38 on the side of the stator 35, the soldering may be executed on the side of the base portion 12 of the circuit board 38. Note that a position of the soldering may be varied depending on the design. Similarly for the circuit component 383, there is no particular position designated for soldering the circuit component 383.

Figure 9:
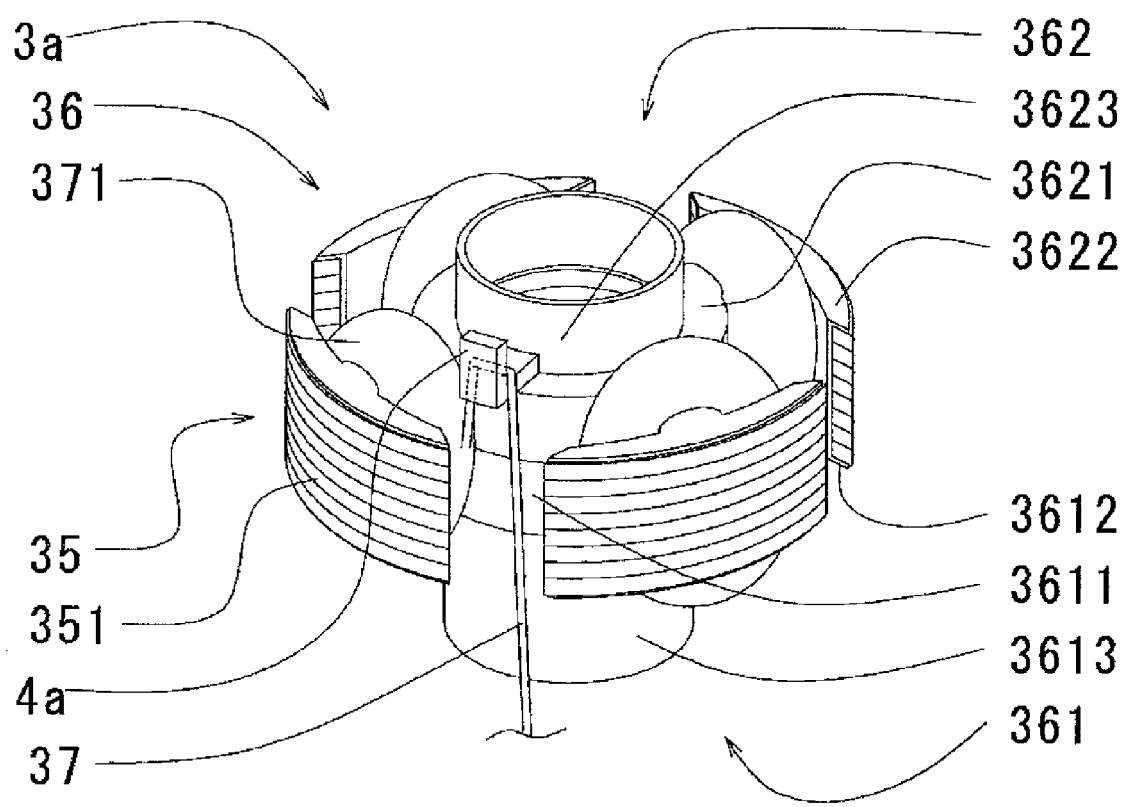
FIG. 9 is a perspective diagram showing the armature according to a variant of the second embodiment.
Figure 10:
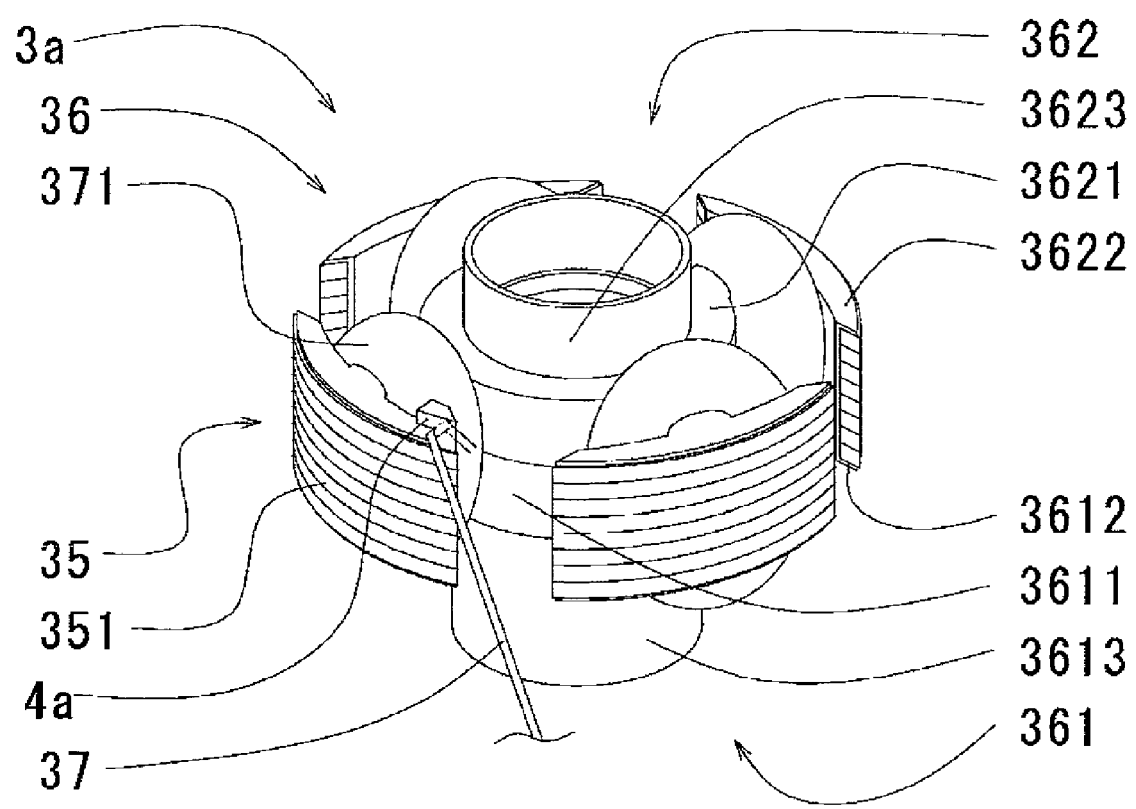
FIG. 10 is a perspective diagram showing the armature according to an alternative variant of the second embodiment.

The hook portion 4a may be, as shown in FIG. 9, formed at the outer side surface of the second cylindrical portion 3623. Also, the hook portion 4a may be, as shown in FIG. 10, formed at the second teeth insulating portion 3622. In either case, the forming of the hook portion 4a will not hinder the forming of the coil 371. Therefore, a large space for forming the coil 37 will be provided around the teeth 351. That is, a space factor for the coil 371 will be improved, thereby allowing the motor to be highly efficient.

Figure 11:
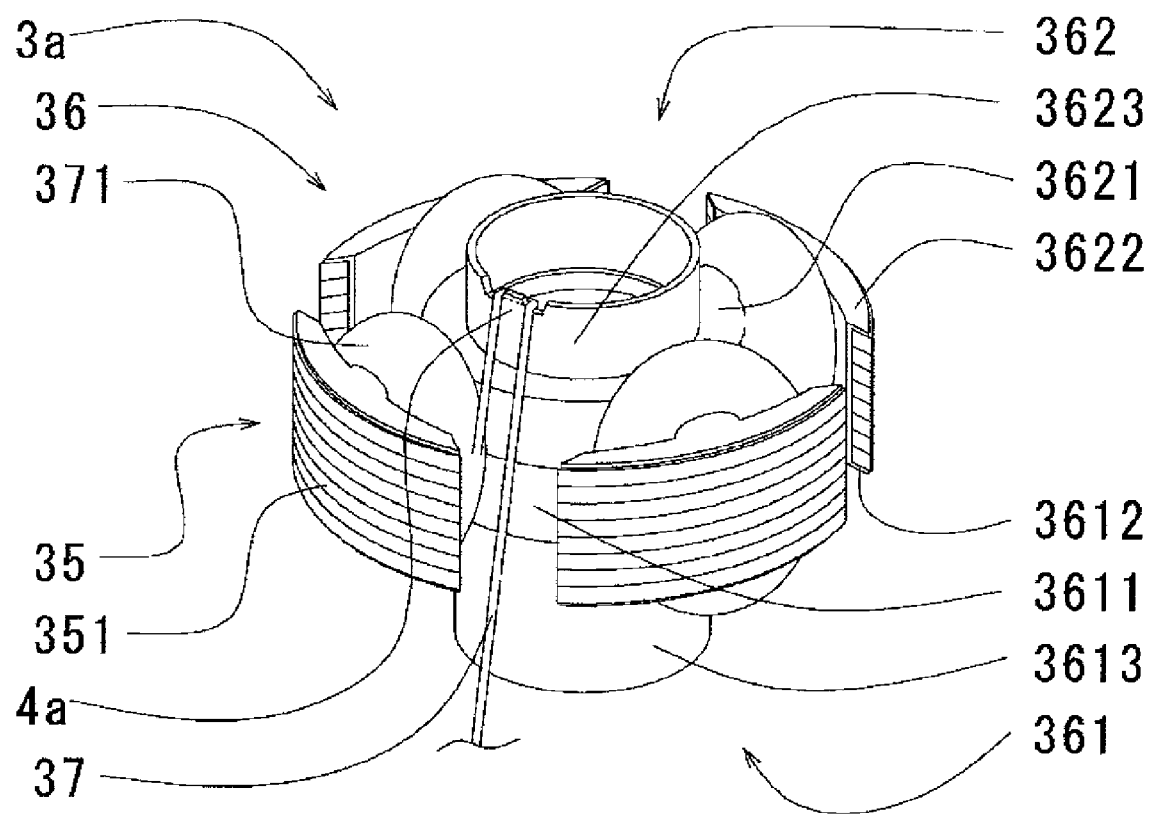
FIG. 11 is a perspective diagram showing the armature according to an alternative variant of the second embodiment.
Figure 12:
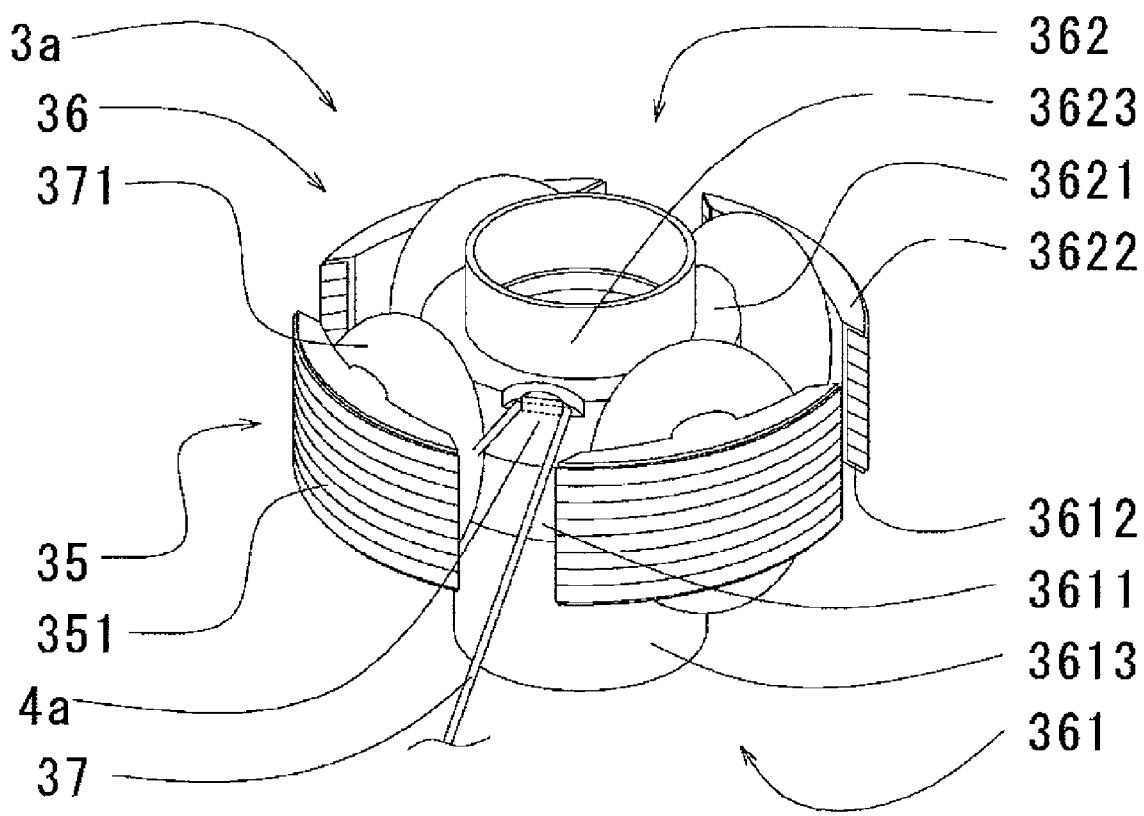
FIG. 12 is a perspective diagram showing the armature according to an alternative variant of the second embodiment.

The configuration of the hook portion 4a is not limited as described above. For example, the hook portion 4a may include, as shown in FIG. 11, two notches at the top end surface of the second cylindrical portion 3623. For such configuration, man-hour required for designing mold will be reduced, and therefore the productivity will be improved. The hook portion 4a shown in FIG. 11 is operable to allow the magnet wire 37 to be hooked thereon in the similar manner as the hook portion 4a shown in FIG. 7. Also, the hook portion 4a may include, as shown in FIG. 12, a notch at the top end surface of the second core back insulating portion 3621. Such configuration allows the similar effect.

Figure 8:
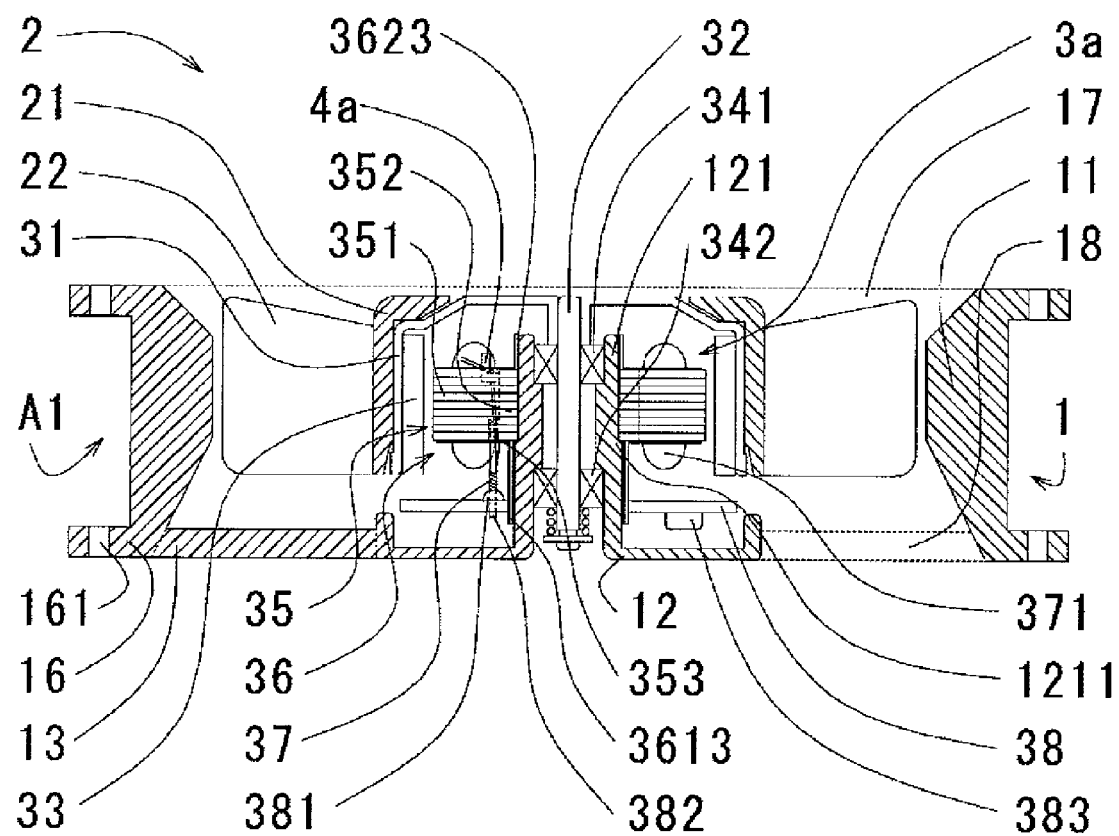
FIG. 8 is an axial cross sectional diagram showing the axial flow fan as seen from a radial direction according to a variant of the second embodiment.

The magnet wire 37 may be, as shown in FIG. 8, electrically connected to the land 381 via the conductive pin 382. That is, the magnet wire 37 is not restricted to electrically connected to the land 381. The conductive pin 382 is stably supported to the second core back insulating portion 3621. The magnet wire 37 hooked on the hook portion 4a is wound around the conductive pin 382. At this point, the portion of the magnet wire 37 wound around the conductive pin 382 is soldered which melts the resin coating on the surface of the magnet wire 37, whereby the magnet wire 37 and the conductive pin 382 are electrically connected to one another. Then, the conductive pin 382 is inserted through the through hole formed at the circuit board 38. The land 381 is formed around the through hole. When the land 381 and the conductive pin 382 are soldered to one another, the land 381 and the conductive pin 382 are electrically connected to one another. Further, since the conductive pin 382 is affixed to the circuit board 38 by soldering, the armature 3 and the circuit board are affixed to one another. As shown in FIG. 8, when the circuit wiring is formed at both sides, soldering to affix the conductive pin 382 may be conducted on either side. When the circuit wiring is formed at only one side, soldering is to be conducted on the side the circuit wiring is formed.

Next, a flow fan according to a third embodiment of the present invention will be described. A configuration of the flow fan according to the third embodiment is substantially identical with the configuration of the flow fan A shown in FIG. 1 except for lack an insulator. In the description herein, corresponding elements are denoted with the same reference numerals. Also, a size of the flow fan is the same as that in the first embodiment.

Figure 13:
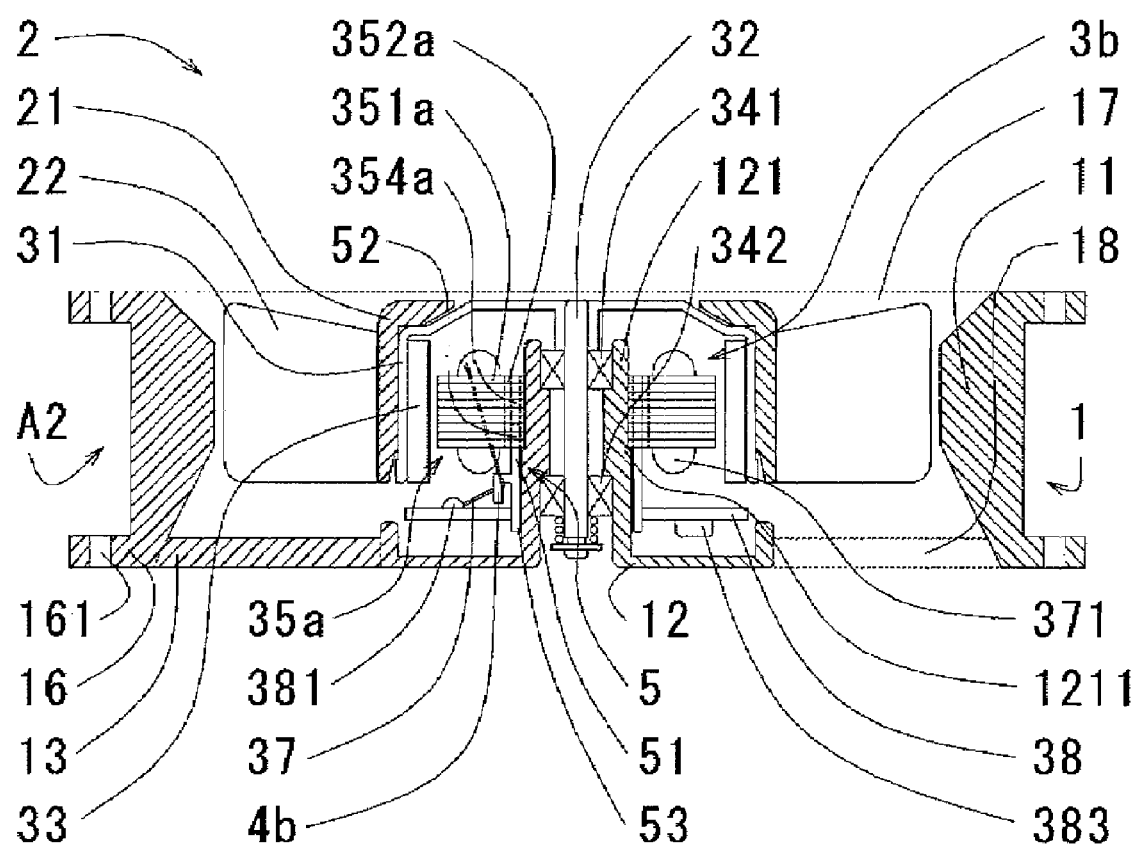
FIG. 13 is a cross sectional diagram showing the axial flow fan as seen from the radial direction according to a third embodiment.
Figure 14:
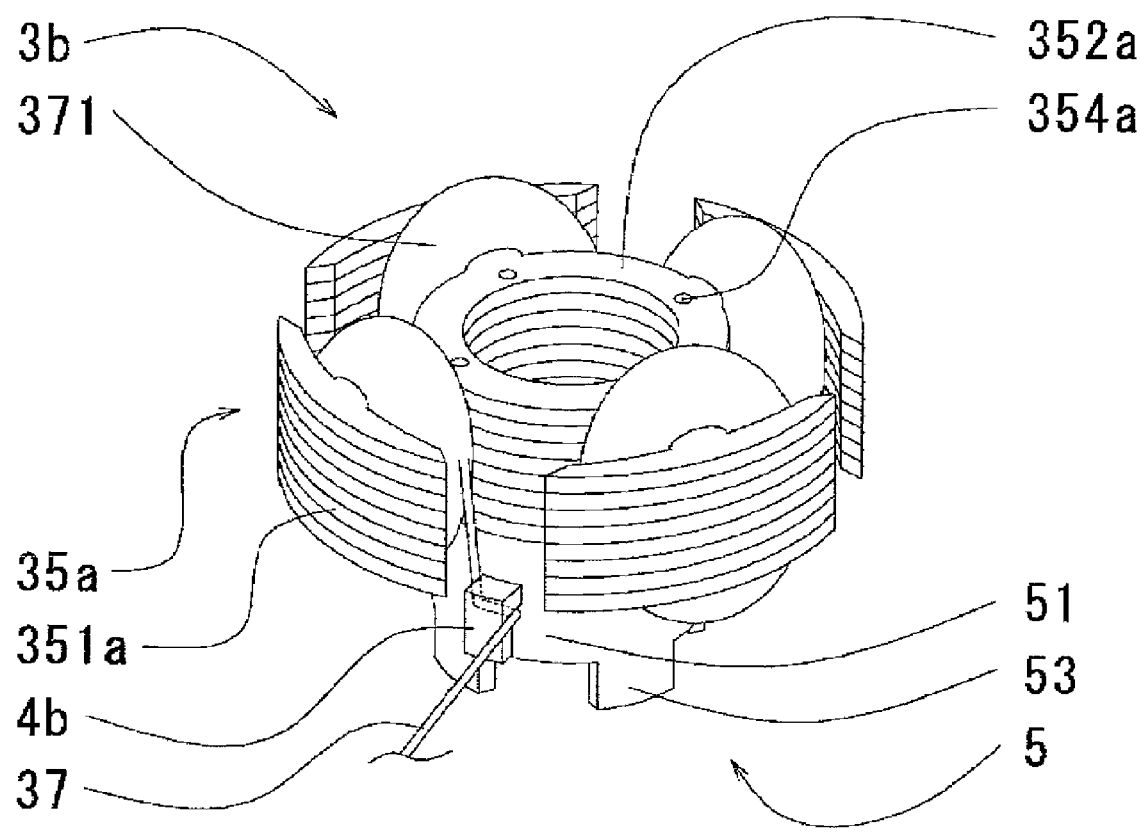
FIG. 14 is a perspective diagram showing the armature and a spacer according to the third embodiment.

FIG. 13 is a diagram showing a cross sectional in the axial direction as seen from the radial direction of the flow fan A2 according to the third embodiment of the present invention. FIG. 14 is a perspective view of an armature according to the third embodiment of the present invention.

An armature 3b will be attached to an outer circumferential surface of the bearing housing 121 from the axially above. The armature 3b will be supported by the step portion 1211 arranged at the outer circumferential surface of the bearing housing 121. The armature 3b includes a stator core 35a, a spacer 5 and the magnet wire 37.

The stator core 35a is formed by laminating a plurality (9 in the present embodiment) of core plates in the axial direction and caulking them in order to join them. A silicon steel plate, for example, is used as a material for the core plate. The stator core 35a includes a core back 352 of a substantially annular shape of a substantially cylindrical shape. A plurality (4 in the present embodiment) of teeth 351a are arranged at a radially outer surface of the core back 352a in the radial direction centering about the central axis. Since the plurality of teeth 351a and the core back 352a are formed continuously, a magnetic circuit having a reduced magnetic loss is generated at the space between the plurality of teeth 351a and the core back 352a. An outer surface of each tooth 351 is opposed via a radial gap to the rotor magnet 33 affixed to the inner circumferential surface of the rotor yoke 31. Also, on a surface of the stator core 35a an insulating layer is formed by powder coating or the like. Each tooth 351 has the magnet wire 37 wound thereon via the insulating layer. The core back 352 has formed thereon a spacer through hole 354a.

The spacer 5 is made by the injection molding using a resin material (e.g., nylon, PBT (polybutylene telephthalate), or POM (polyacetal)). The spacer 5 includes and is formed continuously by the injection molding with a spacer cylindrical portion 51, a first connecting portion 52, and a second connecting portion 53.

The spacer cylindrical portion 51 has formed thereon the first connecting portion 52 (4 in the present embodiment). The first connecting portion 52 is inserted into the spacer through hole 354a (4 in the present embodiment) formed in the core back 352a from the bottom thereof in order to affix the stator core 35a to the spacer 5. When the first connecting portion 52 is inserted into the spacer through hole 354a, a bottom end surface of the core back 352a makes contact with a top surface of the spacer cylindrical portion 51, and a position of the spacer 5 with respect to the stator core 35a will be fixed.

At a lower surface of the spacer cylindrical portion 51, the second connecting portion 53 will be formed. The second connecting portion 53 is inserted into the central hole of the circuit board 38 from the axially upper side in order to affix the spacer 5 to the circuit board 38. The circuit board 38 is such that a side thereof at which the circuit component 383 is soldered to the circuit wiring is opposed to the base portion 12 in the axial direction. The armature 3b and the circuit board 38 are connected to one another via the spacer 5. Therefore, it becomes possible to attach the armature 3b and the circuit board 38 integrally to the outer circumferential surface of the bearing housing 121. However, note that a connection method of the stator core 35a and the spacer 5, or a connection method of the circuit board 38 and the spacer 5 are not limited as described above. For example, a screw or an adhesive may be used.

Next, a hook portion 4b will be described. As shown in FIG. 14, the hook portion 4b is formed protrudingly in the radially outward direction at the outer side surface of the spacer cylindrical portion 51. The magnet wire 37 which forms the coil 371 is hooked on the hook portion 4b. As described above, the predetermined amount of tension is applied to the magnet wire 37 when wound around the teeth 351a to form the coil 371. The predetermined tension is maintained at the coil 371 since the magnet wire 37 is hooked on the hook portion 4b. It becomes possible to have the tension of the magnet wire 37 reduced at the end portion thereof which is hooked on the hook portion 4b and is opposite from the side of the coil 371. As for a method of hooking the magnet wire 37 on the hook portion 4b, the magnet wire 37 may be hooked on the hook portion 4b, wound around the hook portion 4b, and/or the like. Since the magnet wire 37 after hooked on the hook portion 4b can have the reduced tension, it becomes possible to avoid a strong tension when the magnet wire 37 is soldered to the land 381. According to the present embodiment, the magnet wire 37 is wound around the teeth 351a, hooked on the hook portion 41b, and the end portion thereof is soldered to the land 381. However, note that the order in which the processes are executed is not limited as described above; the magnet wire 37 may be soldered to the land 381, and then hooked on the hook portion 4.

Next, a detailed configuration of the hook portion 4b will be described. The hook portion 4b is, as shown in FIG. 14, formed protrudingly at the outer side surface of the spacer cylindrical portion 51 in the radially outward direction, wherein the bent portion is bent axially downward. When the magnet wire 37 is hooked on the hook portion 4b near the bent portion, the magnet wire 37 is securely hooked on the hook portion 4b. To describe more in detail, the magnet wire 37 is extracted from the coil 371 to the hook portion 4b in the axial direction. Then, the magnet wire 37 is hooked on the hook portion 4b, and extracted in the radially outward direction from the hook portion 4b. That is, the magnet wire 37 on the side of the coil 371 is hooked on the hook portion 4b toward the spacer cylindrical portion 51 than the bent portion, and the magnet wire 37 on the side of the end portion is hooked on the hook portion 4b toward the tip than the bent portion. By virtue of such configuration, it becomes possible to change a direction (i.e., axial direction or radial direction) to which the magnet wire 37 is extracted when the magnet wire 37 is hooked on the hook portion 4b. Note that the configuration of the hook portion 4b is not limited as described above. The hook portion 4b needs to be designed such as to allow the magnet wire 37 to be hooked thereon in one direction and to be extracted therefrom in another direction while securing the magnet wire 37.

According to the present embodiment, as shown in FIG. 13, the circuit board 38 has formed thereon, on the side the armature 3b is, the land 381 on which the end of the magnet wire 37 is soldered. Also, the circuit component 383 is soldered to the circuit board 38 on the side thereof facing the base portion 12. Since the magnet wire 37 is hooked on the hook portion 4b, even when the magnet wire 37 is slackened at the end portion thereof, the slack is less likely to be shifted to the magnet wire 37 on the side of the coil 371 than the hook portion 4b. Although the present embodiment assumes that the end portion of the magnet wire 37 is soldered to the circuit board 38 on the side of the stator 35a, the soldering can be executed on the side of the base portion 12 of the circuit board 38. Note that a position of the soldering may be varied depending on the design. Similarly for the circuit component 383, there is no particular position designated for soldering the circuit component 383.

The spacer 5 is made of a resin material and formed by the injection molding. The mold used for the injection molding to form the spacer 5 includes the sliding side mold and the fixed side mold. The fixed side mold and the sliding side mold make contact with one another in the axial direction. Then, the resin material is injected into the space generated between the molds. After the injected resin material is cooled and hardened, the fixed side mold and the sliding side mold are removed from one another forming the spacer 5. Here, the hook portion 4b connecting the stator core 35a and the spacer 5 is arranged between two adjacent teeth 351a at the outer side surface of the spacer cylindrical portion 51. Therefore, the hook portion 4b will not interrupt with the formation of the coil 371. Therefore, a large space will be provided around the teeth 351a. That is, a space factor for the coil 371 will be improved, thereby allowing the motor to be highly efficient.

The magnet wire 37 is, in order to form the coil 371, wound around the teeth 351a each extending in the radial direction, wherein the radial direction is the center of the winding. Therefore, it is difficult to guide the magnet wire 37 extending from the coil 371 in the radially outward direction. However, as described above, when the magnet wire 37 is hooked on the hook portion 4b, the direction in which the magnet wire 37 is guided may be changed. Therefore, the magnet wire 37 extracted from the coil along the circuit board 38 is extracted radially outwardly and soldered to the land 381.

At the surface bordering the soldering portion between circuit board 38 and the magnet wire 37, a stress extending from the soldering portion in the direction the magnet wire 37 extends is generated. The stress can be broken into tensile stress acting perpendicularly to the bordering surface, and shear stress acting parallely. At the bordering surface between the soldering portion and the circuit board 38, the shear stress has a greater strength for peeling than the tensile stress. Therefore, it is preferable that the magnet wire 37 is soldered to the land 381 along the circuit board 38. Since the hook portion 4b is formed at the spacer 5, the magnet wire 37 hooked on the hook portion 4b is more easily extracted in the parallel manner with respect to the circuit board 38.

OTHER EMBODIMENT

Although the axial flow fan A has been described as the first embodiment, second embodiment and the third embodiment of the present invention, the present invention is not limited to the axial flow fan. The present invention may be applicable to a centrifugal fan or a DC brushless motor having a configuration in which a magnet wire extracted from a coil is hooked on the hook portion.

According to the first, second and the third embodiment, the configuration of the DC brushless motor is an outer rotor type in which the rotor magnet 33 is radially opposed in the outward direction via a gap to the teeth 351 or the teeth 351a. The configuration of the present invention may be an inner rotor type in which the rotor 33 is radially opposed in the inward direction via a gap to the teeth 351.

INDUSTRIAL APPLICABILITY

The present invention is applicable in an armature of a DC brushless motor using a magnet wire having an especially large diameter.

The invention claimed is:

1. A brushless motor comprising:
   an armature comprising a core back, a plurality of teeth extended from the core back, said plurality of teeth being arranged in a radial manner centering about a central axis, an insulator made of an insulating material covering at least a small portion of an outer surface of the plurality of teeth, and a coil formed by winding a magnet wire around each of the plurality of teeth via the insulator;
   a rotor portion including a rotor magnet generating between the armature a torque centering about the central axis, the rotor portion rotating relatively with respect to the armature centering about the central axis;
   a base portion supporting the armature in a fixed manner; and
   a circuit board arranged between the armature and the base portion, and configured thereon a circuit controlling a rotation of the rotor portion; wherein the insulator includes a hook portion formed at a space between adjacent teeth when seen from the axial direction;

the magnet wire extracted from the coil is hooked on the hook portion and is further extended and electrically connected to the circuit board at the end of the magnet wire, the magnet wire being bent at the hook portion toward a direction different from a direction in which the magnet wire extends off the coil; and a tension applied to a portion of the magnet wire between the hook portion and the end is smaller than that applied to a portion of the magnet wire between the coil and the hook portion.

2. The brushless motor according to claim 1, wherein an end portion of the magnet wire hooked on the hook portion is extracted in a radially outward direction from the hook portion and is electrically connected to the circuit board.

3. The brushless motor according to claim 1, wherein the circuit board is connected to the armature via the insulator.

4. The brushless motor according to claim 1, wherein the insulator is made of a resin material by an injection molding.

5. The brushless motor according claim 1, wherein the insulator includes a core back insulating portion covering an outer side surface of the core back, the hook portion is formed at the core back insulating portion.

6. The brushless motor according to claim 1, wherein the core back insulating portion includes a cylindrical portion centering about the central axis in a direction away from the core back in an axial direction parallel to the central axis, the hook portion is formed at the cylindrical portion.

7. The brushless motor according to claim 1, wherein the insulator includes a teeth insulating portion covering the teeth, wherein the hook portion is formed at the teeth insulating portion.

8. The brushless motor according to claim 1, wherein the insulator comprises a first insulator attached to the core back and each tooth from a side of the base portion, and a second insulator attached to the core back and each tooth from a side opposite from the base portion.

9. The brushless motor according to claim 8, wherein the hook portion is formed at the first insulator.

10. The brushless motor according to claim 8, wherein the hook portion is formed at the second insulator.

11. The brushless motor according to claim 1, wherein the magnet wire is electrically connected via a conductive pin affixed to the insulator to the circuit board at the end of the magnet wire.

12. The brushless motor according to claim 1, wherein the hook portion includes a portion which is bent.

13. A fan unit using the brushless motor according to claim 1, wherein the rotor portion comprises a plurality of blades rotating, intaking air from one end in the axial direction and thereby generating an air flow directed to the other end in the axial direction;

the plurality of blades are surrounded in the radial direction by a housing forming a pathway for the air flow; and the housing and the base portion are connected by the supporting leg portion.

14. A fan unit using the brushless motor according to claim 1, wherein the rotor portion comprises:

a plurality of blades arranged at the rotor portion at radially outer side thereof in the circumferential manner centering about the central axis, and a housing formed such as to exhaust in the radially outward direction air taken in in the axial direction.

15. The brushless motor according to claim 1, wherein the magnet wire is soldered to the land along the circuit board.

16. The brushless motor according to claim 1, wherein a portion of the magnet wire between the hook portion and the end is freely extended.

* * * * *